United States Patent [19]
Flesher et al.

[11] Patent Number: 5,362,517
[45] Date of Patent: Nov. 8, 1994

[54] METHODS OF MAKING CRYSTALLINE-COATED POLYMERIC MATERIALS

[75] Inventors: Peter Flesher, Bingley; David Farrar, Bradford; Malcolm Skinner, Bradford; Brian Dymond, Bradford, all of England

[73] Assignee: Allied Colloids Limited, West Yorkshire, United Kingdom

[21] Appl. No.: 960,397

[22] PCT Filed: May 14, 1992

[86] PCT No.: PCT/GB92/00868
§ 371 Date: Jan. 15, 1993
§ 102(e) Date: Jan. 15, 1993

[87] PCT Pub. No.: WO92/20727
PCT Pub. Date: Nov. 26, 1992

[30] Foreign Application Priority Data
May 17, 1991 [GB] United Kingdom ............... 9110719

[51] Int. Cl.$^5$ .............. B05D 7/02; B32B 27/06; C08K 9/02; C08K 9/10
[52] U.S. Cl. .............. 427/222; 428/407; 523/204; 523/205; 523/207; 523/210
[58] Field of Search .............. 523/204, 205, 207, 210; 428/407; 427/222

[56] References Cited

U.S. PATENT DOCUMENTS

| | | | |
|---|---|---|---|
| 3,657,182 | 4/1972 | Jolly | 524/161 |
| 3,766,120 | 10/1973 | Gershberg | 524/423 |
| 4,010,135 | 3/1977 | Tutein | 524/377 |
| 4,012,354 | 3/1977 | Paul | 524/376 |
| 4,105,827 | 8/1978 | Brichard et al. | 428/403 |
| 4,409,353 | 10/1983 | Umekawa et al. | 524/423 |
| 4,880,870 | 11/1989 | Zimmermann et al. | 523/204 |

FOREIGN PATENT DOCUMENTS

| | | |
|---|---|---|
| 0705658 | 3/1954 | United Kingdom . |
| 1191356 | 5/1970 | United Kingdom . |

*Primary Examiner*—Peter Szekely
*Attorney, Agent, or Firm*—Dickstein, Shapiro & Morin, L.L.P.

[57] ABSTRACT

Particulate water-soluble or water-swellable polymeric material is provided with a substantially uninterrupted continuous coating of crystalline material. Single particles or aggregates having a size below 1 mm in size can be made by mixing the polymeric particles with a substantially saturated or supersaturated aqueous solution of crystallizable material (optionally a melt of hydrate crystallizable material) and thereby depositing it as a continuous crystalline coating on the particles.

14 Claims, No Drawings

METHODS OF MAKING CRYSTALLINE-COATED POLYMERIC MATERIALS

This invention relates to particulate compositions of water soluble or water swellable polymeric material, and their preparation and use, wherein the compositions are particularly designed to distribute very rapidly and easily into water or other aqueous medium.

It is well known that when particles of water soluble or water swellable polymeric material are mixed with water there is a tendency for the particles to agglomerate into sticky lumps. Initial contact of the water with the polymer particles tends to form a sticky gel around the surfaces of the particles. The presence of this gel layer tends to reduce ingress of water into the particles, thus reducing the rate of dissolution or swelling of the polymer. Because the particles are sticky, they tend to agglomerate, thus reducing still further the ingress of water into the particles. This problem increases as the molecular weight of the polymer increases and as the particle size decreases. Thus, although small particles ought to dissolve or swell more quickly (because in theory they have a larger surface area exposed to water) in practice the presence of "fines" tends to lead to agglomeration problems.

It is therefore necessary to try to keep the particles apart during the initial dissolution stages, so as to prevent agglomeration.

One standard technique is to wet the particles with an organic solvent such as acetone before admixture with water, but the use of organic solvent is inconvenient on an industrial scale.

Various forms of mixing apparatus are known but many of them do not really solve the problem since they tend to apply turbulence after the formation of sticky aggregates, rather than prevent the formation of sticky aggregates. One successful apparatus involves entraining the particles in air and passing this stream through a mist of water droplets, so that initial swelling and dissolution starts while the particles are entrained in air. This is successful, but it would be desirable to provide the composition in a form that could easily be dissolved or distributed into water merely by mixing.

Numerous proposals have therefore been made for providing the polymer particles in compositions which have the property of promoting distribution in water.

One known method comprises providing cross linking at the surface of the particles, for example by spraying powdered particles of sodium polyacrylate homopolymer or copolymer with a polyvalent metal compound or by including such a compound in an oil phase in which the particles are made by reverse phase polymerisation.

This technique can be adequate when the particles are relatively large (e.g., above 100 μm) and when the polymer is a swellable cross linked polymer. It can be less satisfactory when the polymer is intended to be wholly soluble, since the cross linking can produce some insolubility. The process can be inconvenient and uneconomic to operate on a large scale and tends to give incomplete surface treatment. Thus, when spraying, parts of the polymer surfaces are liable to remain untreated. In particular, the process is inadequate for the treatment of polymer fines. If sufficient is applied for treating fines and/or minimising the risk of an incomplete coating, the risk of insolubility increases.

It is also known to provide pellets of polymeric particles that are pressed together in admixture with diluents and fillers, that may be a variety of particulate materials that can be soluble or insoluble and can be organic or inorganic. When the filler is a particulate inorganic material, the pellet consists of the polymer particles in side by side relationship with the filler particles. If the filler is easily water soluble, it may promote the permeation of water into the pellet and accelerate the initial disintegration of the pellet. However once permeation of water and disintegration of the pellet starts, the surfaces of the particles will be exposed to each other and to water, and so again gel blocking is likely to occur, especially in view of the close proximity of the water soluble particles at this stage.

There have also been proposals to improve water-dispersibility merely by combining inorganic material with the polymer particles, i.e., without the compression step involved in making pellets.

In JP-A-50013278 polymer is mixed with sodium sulphate decahydrate, or other inorganic salt, and this results in swelling of the polymer particles (presumably due to the transfer of water from the decahydrate to the polymer particles). An apparently similar process is described in U.S. Pat. No. 4,409,353. The inorganic component is provided in a pre-formed crystalline state. Unless extremely large amounts of the inorganic material are used, it is inevitable that significant parts of the surface of the polymer particles will remain exposed, i.e., not covered by inorganic material. Accordingly, although the inorganic material can promote distribution in water, there are still exposed surfaces that are liable to cause some agglomeration during contact with water, and this will be a particular problem if the polymer particle size is very small.

Instead of mixing dry, it is also known to mix the particles with the polymer while it is in the form of a gel, for instance as described in DE 2,535,167 and U.S. Pat. No. 3,766,120. However this will encounter the same disadvantages.

It is also known to include surfactants with the inorganic material, for instance as in U.S. Pat. Nos. 3,657,182 and 4,012,354.

In U.S. Pat. No. 4,010,135 ethylene glycol is included with the polymer and the inorganic salt to serve as a bonding agent.

In JP-A-57162610 and JP-A-57049643 polymer powder is added to, for instance, a 25% aqueous solution of sodium sulphate or sodium carbonate and polyethylene glycol and is subjected to kneading. The kneading and mixing results in the formation of lumps and these are then pulverised by milling. In a comparative example, the polyethylene glycol is omitted and it is stated that the product is then more difficult to pulverise into powder. Accordingly it seems that the polyethylene glycol is acting as a release aid to promote disintegration of the lumps by milling. It appears that the polymer particles within the lumps had significant parts of their surfaces untreated with the inorganic salt, as otherwise they would not have bonded firmly to one another. Also, the act of milling the lumps will inevitably tend to dislodge inorganic material that is on exposed surfaces of polymer particles, thus increasing the proportion of the polymer surface area that is uncovered and is potentially liable to cause agglomeration problems when the particles are mixed into water.

In EP-A-0123486 a polymerisation (which is usually a gel polymerisation) is conducted using an aqueous monomer mixture that includes a heat sink material such as a sodium sulphate hydrate. The heat sink material absorbs exothermic heat of polymerisation and so assists in controlling the temperature within the polymerising mixture. The gel that is formed will be a substantially uniform admixture of the resultant sodium sulphate and polymer, with the materials being admixed presumably on a sub-micron, almost atomic, scale. That process is very useful for optimising the quality of the polymer (as a result of the improved temperature control) but no attempt has been made to examine the dissolution properties of the polymers and indeed it seems probable that the polymer particles have always been dissolved using conventional dissolving systems that are designed for conventional polymers.

For economic reasons, it is inevitable that the majority of water soluble polymer particles will continue to be made by conventional techniques that do not incorporate special additives in the polymerisation mixture and conventional production techniques can be expected to continue to provide those particles having the conventionally desirable size range (typically 100 to 1000 $\mu$m) and fines (typically less than 100 $\mu$m). Fines create an additional problem both because of the difficulty of dissolving them in water and because of the difficulty of handling them in a manner that is safe and that prevents their attainment into the atmosphere.

There is therefore still an urgent need for a way of treating preformed particles to make it easier to distribute them into water, and in particular there is a need for a way of treating fines so as to utilise them safely and to put them into a form that can easily be distributed into water.

A particulate composition according to the invention comprises water-soluble crystalline material and water-soluble or water-swellable polymeric material and is in the form of bodies of which at least 90% by weight are below 1 mm in size and which comprise either single particles of the polymeric material or aggregates of particles of the polymeric material, and substantially every body has a substantially uninterrupted continuous coating of the crystalline material on the outer surface of the particles or aggregates of particles of polymeric material.

The crystalline material preferably has been obtained by crystallisation from a solution of crystallisable material and the particulate composition has been made by a process comprising adsorbing on to the polymeric particles an aqueous solution that is at least substantially saturated with the crystallisable material and thereby crystallising the crystalline material on to the polymer particles.

The invention also includes a method of forming coated bodies of water-soluble or water-swellable polymeric material having a size at least 90% by weight below 1 mm coated with water soluble, crystalline, material obtainable from an aqueous solution of crystallisable material, the method consisting of mixing a mass of polymeric material in the form of particles at least 90% by weight below 1 mm in size with a solution of the crystallisable material that is at least substantially saturated and absorbing the solution into the particles and thereby crystallising crystalline material on to the particles as a coating, and optionally drying the resultant mass, and in this method the selection of the amount and concentration of the said solution and the mixing conditions are such that agglomeration of the particles during the process is restricted to give a particle size in the resultant mass, after the optional drying, of at least 50% by weight below 1 mm, and if necessary this product can be screened to recover a product of at least 90% by weight below 1 mm.

In the invention, substantially each of the bodies in the product has a substantially uninterrupted continuous coating of the crystalline material. It is continuous in the sense that the crystals of crystalline material are each substantially in contact with each other so as to provide a continuous layer of crystalline material over the polymer. It is substantially uninterrupted in the sense that there are substantially no fractures or gaps in the coating, for instance as is inevitable if the material is subjected to milling. Microscopic examination and photomicrographs clearly demonstrates the difference between the products of the invention, products as in JP-A-5749643 that have been made by a milling operation (thus causing interruptions in the inorganic coating) and products merely made by blending inorganic material with polymer particles (thereby giving a discontinuous coating).

When the initial polymer particles are relatively large, it is necessary that they should not undergo significant aggregation, or else the resultant bodies will be too large. However when the polymer particles are small (e.g., below 150 $\mu$m and usually below 100 $\mu$m) aggregation can be very desirable. Thus the fines in a mixture of coarse and fine particles may be aggregated while the coarser particles remain substantially non-aggregated, or a product consisting primarily or wholly of fines can be aggregated. Thus the invention permits the conversion of fines (that previously would have been difficult to handle and difficult to distribute into water) into coarser particles that are easy to handle and easy to distribute into water.

Although the particles in such aggregates can be relatively firmly bonded to one another, the particles within each aggregate will preferably be coated with the crystalline material with the result that the aggregates will be readily disintegratable when mixed with water. Preferably this coating is a substantially uninterrupted and continuous coating adsorbed on to the outer surface of the fine particles.

As mentioned, the desirable size range of polymer particles is typically 100 to 1,000 $\mu$m, and the particulate composition of the invention preferably has at least 90% in this range. Preferably at least 90% by weight of the bodies are below 700 $\mu$m, and generally above 150 $\mu$m.

When the polymer particles are all fines that are to be aggregated in the process, they will generally be at least 80% by weight below 150$\mu$m, and often below 100 $\mu$m. Often, however, the starting polymer particles are a mixture of some fines, for instance up to 30%, with the remainder in the range 100 to 1,000 $\mu$m.

The polymeric material can be any polymer that is liable to undergo gel blocking when particles of it are contacted with water. The polymer will therefore usually be one that has some viscosifying effect when dissolved in water, and so normally should be of moderate to high molecular weight.

It can be a natural polymer such as a starch or cellulose or a derivative thereof, but preferably is a medium to high molecular weight synthetic polymer. For instance the polymer will normally have intrinsic viscosity (IV, measured by a suspended level viscometer in buffered IN NaCl at 25° C.) of at least around 2 dl/g and will normally have a molecular weight of at least 1 million, since it is these and higher molecular weight polymers that benefit most from the invention. The greatest advantage is generally obtained when the molecular weight is at least IV 4 dl/g, generally at least 6 dl/g, and/or the molecular weight is at least 5 million. Typically the polymer has intrinsic viscosity below 20 dl/g if it is cationic and below 35 dl/g if it is anionic, but the invention is applicable to polymers having higher intrinsic viscosities even than these values. However there can be instances where it is useful to apply the invention to lower molecular weight polymers, for instance down to IV 0.5 dl/g or molecular weight 100,000.

The synthetic polymers are normally addition polymers of a water soluble ethylenically unsaturated monomer or monomer blend that can be non-ionic or ionic, and if it is ionic it can be anionic, cationic or amphoteric. Any of the conventional ethylenically unsaturated water soluble monomers can be used.

Acrylamide is the preferred water soluble non-ionic monomer. Water soluble anionic monomers can be carboxylic or sulphonic monomers, such as acrylic acid, methacrylic acid and 2-acrylamido methyl propane sulphonic acid (AMPS, U.S. trade mark) often as alkali metal salts. Cationic monomers can include acid addition and quaternary salts of dialkylaminoalkyl (meth)-acrylates and -acrylamides. However any of the conventional water soluble high molecular weight polymers, and monomers and monomer mixtures from which they are made, can be used in the invention. Particularly preferred polymers are polymers of 0 to 100% of sodium or other water soluble salt of acrylic acid, methacrylic acid or AMPS with 100 to 0% acrylamide or 0 to 100% by weight quaternary salt of dialkylaminoalkyl (meth) acrylate with 100 to 0% by weight acrylamide, although in the latter case smaller amounts of cationic polymers, e.g., up to 70% may be more suitable.

The polymers can have been made by any of the conventional methods. They are generally made either by reverse phase bead polymerisation followed by azeotroping or other drying, and filtration or centrifugation and, optionally, comminution, or else by bulk gel polymerisation followed by comminution and drying, all in conventional manner. They are preferably made in the absence of significant amounts (for instance more than 5 or 10% maximum) of additives that do not participate in the polymerisation and that become included in the polymer particles. For instance the polymerisation mixture is usually substantially free of inorganic hydrates.

The particle size is usually such that at least 90% by weight of the particles have the size above 0.5 μm, usually above 2 μm or 5 μm and generally above 20 μm.

When the invention is being applied to the recovery or use of very fine particles then at least 80% by weight of the particles can have a size below 150μm, and often below 100 μm. These small particles may be fines created during a comminution process or they may be beads or microbeads made during a reverse phase suspension or emulsion polymerisation process. For instance a reverse phase emulsion process could be conducted followed by azeotropic drying and destabilisation of the emulsion so as to allow separation of microbeads. The invention can, however, also be usefully applied to coating particles of a size that can normally be handled without dusting problems, for instance with at least 80, and usually at least 90%, of the particles being above 150 or 200 μm.

The invention is primarily of value when the polymer is water soluble, for instance when it is a water soluble viscosifier or flocculant. However the invention is also of value when the polymer is in the form of water swellable but water insoluble very small particles, typically having a size 0.1 to 10 μm, often 0.5 to 3 μm. These very small particles are useful as viscosifiers and as flocculants while still in particulate form, for instance as described in EP-A-202,780. These small particles can be lightly cross linked in order to render them water insoluble.

The invention can also be applied to other water swellable but water insoluble particles, for instance absorbent particles typically having a size at least 80% above 100 μm. These absorbent particles can be used for absorbing aqueous fluids such as water or urine from various environments, for instance diapers and particulate slurries.

The crystalline material must be highly soluble so that its continuous coating on the polymer particles achieves the desired effect. Preferably the crystalline material is an electrolyte since the presence of a relatively concentrated film of electrolyte around the particles during dissolution can be advantageous.

The crystalline material can be an organic material, such as urea or other crystalline organic compound. However some organic materials such as, for instance, sugar tend to be sticky in the presence of moisture and so may cause unwanted aggregation. Preferably the material is an inorganic salt. This can be a metal or ammonium salt of an organic acid, generally a weak acid such as acetic acid, but more usually the salt is the salt of an inorganic acid. The crystalline material can be of a salt that does not have any water of hydration, for instance ammonium sulphate, but it is generally preferred for the crystalline material in the end product either to be a hydrate or to be an anhydrous salt that can also exist in the form of a hydrate.

The preferred materials are sodium sulphate, that is generally introduced as the decahydrate, sodium carbonate, that is usually introduced as the decahydrate, sodium acetate trihydrate, di-sodium hydrogen phosphate decahydrate and calcium nitrate tetrahydrate. Other salts which may be used include calcium chloride hexahydrate (optionally mixed with potassium chloride), disodium hydrogen phosphate dodecahydrate or heptahydrate, calcium chloride tetrahydrate, sodium thiosulphate pentahydrate, sodium aluminium sulphate dodecahydrate, barium hydroxide octahydrate, zinc nitrate hexahydrate, lithium chloride trihydrate, strontium bromide hexahydrate, calcium bromide hexahydrate, ferric bromide hexahydrate and tetrasodium pyrophosphate decahydrate.

The degree of hydration often drops during the process, either to a lower hydrate or to an anhydrous form, and so in the final composition the above salts may be present as anhydrous or lower hydrate forms.

The nature of the polymer will, in some cases, determine the choice of the coating material to be used, for example when the polymer is cationic in nature, a salt having a high solution pH (e.g., sodium carbonate) may be unsuitable as a coating material since it may hydrolyse the said polymer, causing stickiness of the polymer surface.

In addition, the choice of coating will also depend to an extent upon the end use of the product, for example if the product is to be used in iron-ore pelletisation, salts which generate acidic gases (e.g., sodium sulphate) cannot be used.

The amount of crystalline material will depend upon the properties that are required and the starting polymeric material, especially its particle size. Although the amount of crystalline material can be as high as 70%, it is generally not more than 55% and most usually is not more than 30% or, at the most, 40%. The amount can be as low as 1% but often is at least 2% and usually at least 5%. All these percentages are based on the anhydrous weight of the crystalline and polymeric materials. When the polymer particles are mainly fines (e.g., at least 90% below 150μm) the amount of crystalline material generally needs to be above 10 or 15% and typically is 20 to 30% or more. When the polymer particles are 90% above 100 μm, the amount of crystalline material is generally below 20%, usually below 15%, for instance 2 to 10%.

When the polymer particles are a blend of, for instance, 30 to 70% below 100 μm and 70 to 30% by weight abouve 100 μm the amount of crystalline material is often in the range 5 to 30%, e.g., 10 to 20%.

The benefits of the invention can be obtained even if the particulate composition includes other components such as surfactants, release aids or binders, but an advantage of the invention is that these are usually unnecessary and are best omitted. Suitable binders include low molecular weight polymers such as polyacrylic acid derivatives; polymers of diallyl dimethyl ammonium chloride starches and their derivatives; carboxymethyl cellulose. If desired the final particulate composition can be blended with, for instance, an inert diluent, in which event this is generally (but not essentially) combined with the polymeric material after the formation of the uninterrupted continuous coating of crystalline material.

An advantage of the invention is that the particulate composition can be dissolved very easily into water and this can be achieved without special mixing equipment. As a result, it is no longer essential to make up an initial solution and then to add this solution to the liquor that is to be treated and, instead, the particulate composition can be dosed direct into the liquor that is to be treated. For instance if the polymer is a flocculating agent then the particulate composition can be mixed into an aqueous dispersion that is to be flocculated, for instance by mixing in a tank or by addition to a flowing stream through a pipe, duct or ditch.

If the polymeric material is a viscosifier then an aqueous composition can be viscosified by direct addition of the particulate composition to that aqueous composition, in the same manner.

The preferred way of making the particulate composition is by the described method of mixing a mass of the particulate material with a solution of crystallisable material that is at least substantially saturated and that will thereby be absorbed into the exposed surfaces of the particles and will crystallise crystalline material on to the particles as a substantially continuous coating. Preferably the solution is fully saturated but adequate results can be obtained if the solution is slightly below saturated, for instance down to 80 or 90% saturation. Lower values are undesirable as they increase the amount of water that is incorporated, thus increasing the risk of the polymer particles being rendered sticky and increasing the probability that artificial drying will be needed. The use of supersaturated solutions is particularly advantageous.

In one convenient process the crystallisable material is provided initially as a substantially saturated or supersaturated aqueous solution and this is then mixed with the polymeric material. If the polymer is added to the solution, it can be very difficult to avoid excessive agglomeration of the polymer particles during the early stages and so it is generally preferred to add the solution gradually to a mass of the polymer particles, while mixing. The rate of addition should be gradual and it and the method of mixing must be optimised so as to avoid any unwanted agglomeration, while generally allowing agglomeration of fines.

The solution is preferably added in some manner that minimises localised concentrations of solution. Thus there can be several points of addition or, preferably, the solution is added by spraying so as to optimise the access of the solution to the particle surfaces.

The mixing method should be selected so as to achieve sufficient mobility of the particles to facilitate contact between particles and the coating composition. Examples of such mixing equipment are ploughshare mixers or ribbon blenders. The addition rate of coating solution can be optimised depending on the efficiency of mixing and on the need to minimise agglomeration. Mixing is continued to break down any loose agglomerations.

Typically the addition of coating solution and subsequent mixing occurs over a period of 10 minutes to 2 hours, more preferably 30 minutes.

Avoidance of unwanted agglomeration is assisted by minimising the amount of water (including water of crystallisation) present in the system during the process. Again, the optimum amount depends upon the polymer and its particle size but generally the amount of water in the mass should be below 40% and usually below 30% and most preferably below 20 or 25% (based on the total weight of the mass).

Instead of starting with an aqueous solution, in a preferred method of the invention the crystallisable material is a meltable hydrate. The particulate polymeric material is blended with particles of the meltable hydrate and the blend is heated to a temperature above the melting point of the hydrate to form a supersaturated solution of an anhydrous or lower hydrate form of the hydrate, which then crystallises on to the polymeric particles.

Instead of making the composition by dry mixing the polymer and the meltable material, it is possible to melt the meltable material and then mix it with the polymer, generally by dispersing the polymer into it, whereafter the following stages will be as described above.

When making the composition, the mixture of particulate polymer and molten material may, in some instances, not allow adequate coating of the hydrate on to the particles and/or adequate aggregation of particles to form desired agglomerates. If this problem is encountered, then it is desirable to add a little water sufficient to promote agglomeration, In all the processes, it is necessary to optimise the materials and mixing conditions so that the product during mixing has a crumbly, substantially non-sticky texture and so that the product either is made initially with the desired particle size or is in the form of such loose aggregates that it is broken down to the desired particle size without milling, but merely during fluid bed or other drying. For instance the moist product may be in crumbly form of very loose and coarse aggregates which, upon drying, spontaneously break down to the desired particle size. Because they were loose aggregates and broke down without milling, the outer surfaces of the polymeric particle or particles in the final aggregates (i.e., the surfaces that would initially contact water when added to water) have a substantially uninterrupted and continuous coating of the crystalline material.

It seems probable that in the melting process, and possibly also in the process starting with the aqueous solution, the polymer particles absorb water out of the solution surrounding the particles whereby it becomes sufficiently supersaturated that crystalline material is deposited on to the outer surface in the form of a very fine and continuous coating. In the melt method, and possibly also in the aqueous solution method, the polymer may absorb water from the deposited crystals so that the final product (after any optional drying stage) may have the crystalline material in the form of a lower hydrate or in anhydrous form.

Although it is preferred that the product resulting from the process should have the desired final particle size, it is often convenient to include a screening step to recover the desired particle size fraction from the product, the coarser particles (and possibly also any fines) being recycled or used for some other purpose. Commercially it is generally unsatisfactory if more than 50% of the product is the wrong size and so the process is normally conducted so that, after the mixing and any drying, at least 50% by weight is below 1 mm and, after screening (if any screening is applied) at least 90% by weight is below 1 mm. Often screening is conducted so as to collect a fraction having a size of, for instance, 100 to 700 μm.

Although milling can be applied to unwanted coarse particles the milled product will be inferior and will not have the required substantially uninterrupted and continuous coating and so the preferred process of the invention consists only of the mixing stage optionally followed by drying stage. The incorporation of the drying stage, typically a fluid bed drying stage, is generally advantageous since it is normally desirable for the composition to have a final water content of below 15% and often below 10% (including the water of hydration, and based on the total weight of composition), and the evaporation of the water reduces the tendency for the composition to be sticky.

If binder or other additive is to be incorporated in the composition, it can be included with the crystallisable material or it can be blended with the polymer particles at an earlier stage.

The following are examples of the production and use of the compositions of the invention.

EXAMPLE 1

300 Kg of a 70:30, by weight, acrylamide:sodium acrylate copolymer with an IV 18 dl/g and particle size below 1 mm was placed in a plough share mixer and agitated. 139 liters of 21.5% $Na_2SO_4$ solution was sprayed into the mixer over 10 minutes and agitation continued for 1 hour. The coated material was removed from the mixer and the moisture content reduced by drying in a fluid bed drier @ 50° C. for up to 1 hour. The final coated product had a composition 90:10 polymer:$Na_2SO_4$ with a particle size 90% below 1 mm. The coated material was readily dispersible in water.

EXAMPLE 2

300 Kg of the polymer as in example 1 was mixed with 68 Kg $Na_2SO_4.10H_2O$ in a ribbon blender. The temperature was raised to 35° C. and mixing continued for 1 hour. The coated material was further processed as in example 1 to remove moisture. The final coated product had a composition 90:10 polymer:$Na_2SO_4$ with a particle size 90% below 1 mm. The coated material was readily dispersible in water.

EXAMPLE 3

100 g of polymer fines of a polymer of 70:30 acrylamide:sodium acrylate, having an IV of 10 dl/g and a particle size of 90% less than 150μm was mixed with 100 g sodium sulphate decahydrate. The mixture was heated to 32° C. with agitation being applied. This temperature was maintained for 10 minutes before the resultant particles were transferred to a fluid bed drier set at 60° C. for 20 minutes.

The aggregated product thus produced had a composition of 70% polymer 30% sodium sulphate with a particle size of 90% 200 μm to 1 mm. The product was readily dispersible in water.

EXAMPLE 4

Example 3 was repeated except that the 100 g of polymer fines was mixed with 75 g of sodium sulphate decahydrate.

The aggregated product had a composition of 75% polymer 25% sodium sulphate with a particle size of 90% 200 μm to 1 mm. The product was readily dispersible in water.

EXAMPLE 5

Example 3 was repeated except that the polymer use was a 60:40 acrylamide:dimethyl amino acrylate quaternised with MeCl, and had an IV 7 dl/g and a particle size of 90% less than 150μm.

The product had a composition 70% polymer 30% sodium sulphate with a particle size of 90% 200 μm to 1 mm. The aggregated product was readily dispersible in water.

EXAMPLE 6

100 g of polymer as for example 3 was mixed with 100 g sodium carbonate decahydrate. The mixture was heated with agitation to 40° C. and 31 g water added. The temperature was maintained for 10 minutes before the product were placed in fluid bed dried at 60° C. for 20 minutes.

The product had a composition of 73.0% polymer 27% sodium carbonate with a particle size of 90% 200 μm to 1 mm. The product was readily dispersible in water.

We claim:

1. A method of forming coated bodies of water-soluble or water-swellable polymeric material coated with substantially uninterrupted continuous coating of water-soluble crystalline material obtained from an aqueous solution of crystallizable material wherein at least 90% by weight of said bodies have a size below 1 mm, the method consisting of mixing a mass of the polymeric material in the form of particles at least 90% by weight of which are below 1 mm with a solution of the crystallizable material that is at least substantially saturated and adsorbing the solution into the particles and thereby crystallizing the crystalline material on to the particles as a coating, and optionally drying the resultant mass, characterized in that the amount and concentration of solution and the mixing conditions are selected such that the total amount of water, including water of hydration, in the mass is below 40% by weight and agglomeration of the particles during the process is restricted to give a particle size in the resultant mass, after the optional drying, wherein at least 50% by weight of the particles are below 1 mm, and if necessary screening the resultant mass to recover a product at least 90% by weight of which has a size below 1 mm.

2. A method according to claim 1, wherein said crystallizable material is provided as a substantially saturated or supersaturated aqueous solution of said crystallizable material, and said aqueous solution is added gradually to said mass of said polymeric material.

3. A method according to claim 1, wherein said method is conducted in the substantial absence of binder or release aid.

4. A method according to claim 1, wherein said bodies are water disintegratable aggregates formed from said particles, and in which said particles within said aggregates are coated with said crystalline material.

5. A method according to claim 4, wherein substantially all of said bodies are aggregates of polymer particles, wherein at least 80% by weight of said polymer particles are of a size below 150 $\mu$m.

6. A method according to claim 4, wherein at least 90% by weight of said bodies are of a size in the range of from 100 to 700 $\mu$m.

7. A method according to claim 1, wherein said crystalline material is selected from the group consisting of crystalline hydrates, anhydrous forms of hydrates and inorganic salts.

8. A method according to claim 1, wherein said crystalline material is selected from the group consisting of sodium sulphate and sodium carbonate.

9. A method according to claim 1, wherein the amount of said crystalline material is in the range of from 5% to 30% based on the anhydrous weight of said crystalline and polymeric materials.

10. A method according to claim 1, wherein said polymeric material is a synthetic polymer, said synthetic polymer being formed by bulk gel or reverse phase polymerization of 0% to 100% acrylamide and 100% to 0% ionic monomer, said ionic monomer being selected from the group consisting of water soluble salts of acrylic acid, methacrylic acid, 2-acrylamido methyl propane sulphonic acid and dialkylaminoalkyl (meth) acrylate quaternary salts.

11. A method according to claim 1, wherein said polymeric material is soluble in water and is a viscosifier or flocculant and has intrinsic viscosity above 4 dl/g.

12. A method according to claim 1, wherein said polymeric material is a viscosifier or flocculant and is in the form of water-swellable but water insoluble particles having a size of 0.1 to 10 $\mu$m.

13. A method according to claim 1, wherein said polymeric material is a cross linked water-swellable absorbent polymer wherein at least 90% by weight of said polymer material has a size above 100 $\mu$m.

14. A method according to claim 1 in which the crystallizable material is a meltable hydrate and the particulate polymeric material is blended with particles of the meltable hydrate and the blend is heated to a temperature above the melting point of the hydrate to form a supersaturated solution of an anhydrous or lower hydrate form, which crystallizes on to the polymer particles.

* * * * *